US011339283B2

(12) United States Patent
Nakanishi

(10) Patent No.: US 11,339,283 B2
(45) Date of Patent: May 24, 2022

(54) THERMOPLASTIC RESIN COMPOSITION AND LAMINATE USING THE SAME

(71) Applicant: RIKEN TECHNOS CORPORATION, Tokyo-to (JP)

(72) Inventor: Ryota Nakanishi, Tokyo-to (JP)

(73) Assignee: RIKEN TECHNOS CORPORATION, Tokyo-To (JP)

( * ) Notice: Subject to any disclaimer, the term of this patent is extended or adjusted under 35 U.S.C. 154(b) by 340 days.

(21) Appl. No.: 16/328,802

(22) PCT Filed: Aug. 25, 2017

(86) PCT No.: PCT/JP2017/030603
§ 371 (c)(1),
(2) Date: Feb. 27, 2019

(87) PCT Pub. No.: WO2018/043357
PCT Pub. Date: Mar. 8, 2018

(65) Prior Publication Data
US 2019/0241731 A1 Aug. 8, 2019

(30) Foreign Application Priority Data
Aug. 31, 2016 (JP) .............................. JP2016-168850

(51) Int. Cl.
| | |
|---|---|
| C08L 53/02 | (2006.01) |
| B32B 15/08 | (2006.01) |
| C08K 5/09 | (2006.01) |
| C08K 5/14 | (2006.01) |
| C08L 45/00 | (2006.01) |
| C08L 65/00 | (2006.01) |
| B32B 27/00 | (2006.01) |
| B32B 27/28 | (2006.01) |
| C08J 3/24 | (2006.01) |
| C09D 145/00 | (2006.01) |
| C09D 153/02 | (2006.01) |
| B32B 27/30 | (2006.01) |
| B32B 27/32 | (2006.01) |
| C08J 3/00 | (2006.01) |
| C08L 23/08 | (2006.01) |

(52) U.S. Cl.
CPC ............ *C08L 53/025* (2013.01); *B32B 15/08* (2013.01); *B32B 27/00* (2013.01); *B32B 27/28* (2013.01); *B32B 27/302* (2013.01); *B32B 27/306* (2013.01); *B32B 27/308* (2013.01); *B32B 27/325* (2013.01); *C08J 3/005* (2013.01); *C08J 3/24* (2013.01); *C08K 5/09* (2013.01); *C08K 5/14* (2013.01); *C08L 23/0846* (2013.01); *C08L 45/00* (2013.01); *C08L 53/02* (2013.01); *C08L 65/00* (2013.01); *C09D 145/00* (2013.01); *C09D 153/02* (2013.01); *B32B 2250/03* (2013.01); *B32B 2255/06* (2013.01); *B32B 2311/24* (2013.01);

*B32B 2439/00* (2013.01); *B32B 2553/00* (2013.01); *C08L 2203/16* (2013.01); *C08L 2205/03* (2013.01)

(58) Field of Classification Search
CPC .... C08L 53/025; C08L 45/00; C08L 23/0846; C08L 2203/16; C08L 2205/03; B32B 27/306; B32B 27/308; B32B 15/08; B32B 27/325; B32B 2255/06; B32B 2250/03; B32B 2553/00; B32B 2439/00; B32B 2311/24; B32B 27/302; C08K 5/14; C08K 5/09; C08J 3/005
USPC ......................................................... 428/516
See application file for complete search history.

(56) References Cited

U.S. PATENT DOCUMENTS

| | | | | |
|---|---|---|---|---|
| 6,730,736 B1 * | 5/2004 | Kaita | ........................ | C08F 8/00 |
| | | | | 525/70 |
| 2007/0155903 A1 * | 7/2007 | Kaneko | ................... | C08L 45/00 |
| | | | | 525/191 |

FOREIGN PATENT DOCUMENTS

| | | |
|---|---|---|
| CN | 101133118 | 2/2008 |
| CN | 106750864 | 5/2017 |
| EP | 1 860 152 | 11/2007 |
| JP | 11-70624 | 3/1999 |
| JP | 2001-98130 | 4/2001 |
| JP | 2003-191380 | 7/2003 |
| JP | 2003-213051 | 7/2003 |
| JP | 2003213051 A * | 7/2003 |
| JP | 2007-182467 | 7/2007 |
| JP | 2014-234417 | 12/2014 |
| JP | 2016-112883 | 6/2016 |
| KR | 10-2007-0110525 | 11/2007 |
| TW | 201602268 | 1/2016 |
| WO | 2016/152389 | 9/2016 |

OTHER PUBLICATIONS

Translation of JP 2003-213051 (patent application 2002-323340), Jul. 30, 2003. (Year: 2003).*
International Preliminary Report on Patentability dated Mar. 14, 2019 in International Application No. PCT/JP2017/030603.
International Search Report dated Nov. 28, 2017 in International Application No. PCT/JP2017/030603.
Extended European Search Report dated Mar. 25, 2020 in corresponding European Patent Application No. 17846362.6.

(Continued)

*Primary Examiner* — Hui H Chin
(74) *Attorney, Agent, or Firm* — Wenderoth, Lind & Ponack, L.L.P.

(57) ABSTRACT

There are provided a thermoplastic resin composition capable of bonding a cyclic polyolefin-based polymer and an ethylene-vinyl alcohol copolymer with sufficient strength and to provide a laminate using the same.

14 Claims, No Drawings

(56) References Cited

OTHER PUBLICATIONS

Office Action dated Oct. 29, 2020 in corresponding Chinese Patent Application No. 201780051648.3 with English-language translation.
Notification of Reason for Refusal dated Jun. 25, 2021 in corresponding Korean Patent Application No. 10-2019-7008557, with Machine Translation.
Office Action dated Mar. 8, 2021 in Taiwanese Patent Application No. 106129674, with English-language translation.

* cited by examiner

THERMOPLASTIC RESIN COMPOSITION AND LAMINATE USING THE SAME

TECHNICAL FIELD

The present invention relates to a thermoplastic resin composition. The present invention more particularly relates to a thermoplastic resin composition comprising a cyclic polyolefin-based polymer and a copolymer of an aromatic vinyl compound and a conjugated diene compound and/or a hydrogenated product thereof, and a laminate using the composition.

BACKGROUND ART

Conventionally, a laminate of a cyclic polyolefin-based polymer and an ethylene-vinyl alcohol copolymer is used for packaging films or containers since the laminate is excellent in strength, transparency, gas barrier property and chemical resistance. In addition, a laminate of a cyclic polyolefin-based polymer and a metal or a metal compound such as an aluminum foil is used for a packaging film or container for contents extremely weak against oxygen or moisture, since the laminate has very high gas barrier properties, and excellent strength and chemical resistance. However, there was a problem that the cyclic olefin-based polymer has insufficient adhesiveness to the ethylene-vinyl alcohol copolymer and the metal or the metal compound such as an aluminum foil. Therefore, it has been proposed to interpose a polyolefin-based polymer or an acid-modified polymer thereof as an adhesive component between them (for example, Patent Documents 1 and 2). However, such techniques have not achieved sufficiency in adhesive strength and further improvement of adhesive strength has been desired.

PRIOR ART DOCUMENTS

Patent Documents

Patent Document 1: JP H11-070624 A
Patent Document 2: JP 2003-191380 A

SUMMARY OF THE INVENTION

Technical Problem

An object of the present invention is to provide a thermoplastic resin composition capable of bonding a cyclic polyolefin-based polymer and an ethylene-vinyl alcohol copolymer with sufficient strength and to provide a laminate using the same. Another object of the present invention is to provide a thermoplastic resin composition capable of bonding a cyclic polyolefin-based polymer and a metal or a metal compound such as an aluminum foil with sufficient strength and to provide a laminate using the same.

Solution of Problem

The present inventor has made intensive studies, and as a result, has found that the above-mentioned objects can be achieved by a specific thermoplastic resin composition.

That is, a first aspect of the present invention provides a thermoplastic resin composition comprising:

(A) 100 parts by mass of a thermoplastic resin;
(B) 0.05 to 5 parts by mass of one or more selected from the group consisting of an unsaturated carboxylic acid and a derivative of an unsaturated carboxylic acid; and
(C) 0.01 to 3 parts by mass of an organic peroxide, said thermoplastic resin (A) comprising:
(a1) 10 to 90% by mass of a cyclic polyolefin-based polymer; and
(a2) 90 to 10% by mass of one or more selected from the group consisting of a copolymer of an aromatic vinyl compound and a conjugated diene compound and a hydrogenated product thereof except for a hydrogenated product of a block copolymer of a polymer block mainly composed of an aromatic vinyl compound and a random copolymer block composed of a conjugated diene compound and an aromatic vinyl compound,
wherein the total of the components (a1) and (a2) is 100% by mass.

A second aspect of the present invention provides the thermoplastic resin composition according to the first aspect of the invention, wherein the component (a1) is a copolymer of a cyclic olefin and an α-olefin having 2 to 8 carbon atoms.

A third aspect of the present invention provides the thermoplastic resin composition according to the first or second aspect of the present invention, wherein the component (a2) is a hydrogenated product of a block copolymer of an aromatic vinyl compound and a conjugated diene compound.

A fourth aspect of the present invention provides the thermoplastic resin composition according to the first or second aspect of the present invention, wherein the component (a2) is a hydrogenated product of a random copolymer of an aromatic vinyl compound and a conjugated diene compound.

A fifth aspect of the present invention provides an adhesive coating material comprising the thermoplastic resin composition according to any one of the first to fourth aspect of the present inventions.

A sixth aspect of the present invention provides the coating material according to the fifth aspect of the present invention, wherein the component (a1) is a copolymer of a cyclic olefin and an α-olefin having 2 to 8 carbon atoms.

A seventh aspect of the present invention provides a laminate comprising a layer comprising a cyclic polyolefin-based polymer, a layer comprising the thermoplastic resin composition according to any one of the first aspect to the forth aspect of the present inventions, and a layer comprising a resin having a polar group, wherein said layers are laminated in this order.

An eighth aspect of the present invention provides a laminate comprising a layer comprising a cyclic polyolefin polymer, a layer comprising the thermoplastic resin composition according to any one of the first aspect to the forth aspect of the present inventions, a layer comprising a resin having a polar group, a layer comprising the thermoplastic resin composition according to any one of the first aspect to the forth aspect of the present inventions, and a layer comprising a cyclic polyolefin-based polymer, wherein said layers are laminated in this order.

A ninth aspect of the present invention provides the laminate according to the seventh or eighth aspect of invention, wherein the resin having a polar group is an ethylene-vinyl alcohol copolymer.

A tenth aspect of the present invention provides a laminate comprising a layer comprising a cyclic polyolefin-based polymer, a layer comprising the thermoplastic resin composition according to any one of the first aspect to the forth aspect of the present inventions, and a layer comprising a metal or a metal compound, wherein said layers are laminated in this order.

An eleventh aspect of the present invention provides a laminate comprising a layer comprising a cyclic polyolefin-based polymer, a layer comprising the thermoplastic resin composition according to any one of the first aspect to the forth aspect of the present inventions, a layer comprising a metal or a metal compound, a layer comprising the thermoplastic resin composition according to any one of the first aspect to the forth aspect of the present inventions, and a layer comprising a cyclic polyolefin-based polymer, wherein said layers are laminated in this order.

A twelfth aspect of the present invention provides the laminate according to the tenth or eleventh aspect of the present invention, wherein said layer comprising a metal or a metal compound is a layer comprising an aluminum foil.

A thirteenth aspect of the present invention provides a process for producing a thermoplastic resin composition comprising a step of melting and kneading a composition, wherein the composition comprises:

(A) 100 parts by mass of a thermoplastic resin;

(B) 0.05 to 5 parts by mass of one or more selected from the group consisting of an unsaturated carboxylic acid and a derivative of an unsaturated carboxylic acid; and (C) 0.01 to 3 parts by mass of an organic peroxide, said thermoplastic resin (A) comprising:

(a1) 10 to 90% by mass of a cyclic polyolefin-based polymer; and (a2) 90 to 10% by mass of one or more selected from the group consisting of a copolymer of an aromatic vinyl compound and a conjugated diene compound and a hydrogenated product thereof except for a hydrogenated product of a block copolymer of a polymer block mainly composed of an aromatic vinyl compound and a random copolymer block composed of a conjugated diene compound and an aromatic vinyl compound, wherein the total of the components (a1) and (a2) is 100% by mass.

A fourteenth aspect of the present invention provides the process according to the thirteenth aspect of the present invention, wherein the component (a1) is a copolymer of a cyclic olefin and an α-olefin having 2 to 8 carbon atoms.

A fifteenth aspect of the present invention provides a process for producing an adhesive coating material comprising:

a step (1) of producing a thermoplastic resin composition by the process according to the thirteenth or the fourteenth aspect of the present invention; and a step (2) of dissolving the thermoplastic resin composition obtained in the step (1) in a solvent.

A sixteenth aspect of the present invention provides a press through package product comprising the laminate according to any one of the seventh aspect to the twelfth aspect of the present inventions.

A seventeenth aspect of the present invention provides a process for producing a press through package product comprising:

a step (1) of producing a thermoplastic resin composition by the process according to the thirteenth or fourteenth aspect of the present invention;

a step (3) of producing a laminate by using the thermoplastic resin composition obtained in the step (1); and a step (4) of producing a press through package product by using the laminate obtained in the step (3).

Advantageous Effects of Invention

The thermoplastic resin composition according to the present invention can bond a cyclic polyolefin-based polymer and an ethylene-vinyl alcohol copolymer with sufficient strength. Further, thermoplastic resin composition according to the present invention has an excellent impact resistance and does not impair the properties of the cyclic polyolefin-based polymer and the ethylene-vinyl alcohol copolymer. Therefore, it is possible to obtain a laminate of both of them with high productivity by interposing the thermoplastic resin composition according to the present invention as an adhesive component between them by means of a co-extrusion method or application as an adhesive coating material or the like. Furthermore, the thermoplastic resin composition according to the present invention has excellent productivity as a composition.

The thermoplastic resin composition according to the present invention can bond a cyclic polyolefin-based polymer and a metal or a metal compound such as an aluminum foil with sufficient strength. Further, thermoplastic resin composition according to the present invention does not impair the properties of the cyclic polyolefin-based polymer and the metal or the metal compound such as the aluminum foil. Therefore, it is possible to obtain a laminate of both of them with high productivity by interposing the thermoplastic resin composition according to the present invention as an adhesive component between them.

DETAILED DESCRIPTION OF THE INVENTION

In the present specification, the term "film" is used as a term which also includes "sheet". The term "resin" is used as a term including not only a resin mixture containing two or more resins but also a resin composition containing a component other than a resin. The phrase "laminating a layer and another layer" includes both laminating the layers directly and laminating the layers with interposing another one or more layers such as an anchor coat layer therebetween. The term "or more" in reference to a value range is used to mean a value or a greater value. For example, 20% or more means 20%, or more than 20%. The term "or less" in reference to a value range is used to mean a value or a less value. For example, 20% or less means 20%, or less than 20%. Furthermore, the term "to" in reference to a value range is used to mean one value, a value greater than one value and less than another value, or the another value. Here, the "another value" is to be a value greater than the "one value". For example, 10 to 90% means 10%, more than 10% and less than 90%, or 90%.

The thermoplastic resin composition according to the present invention comprises (A) 100 parts by mass of a thermoplastic resin, (B) 0.05 to 5 parts by mass of one or more selected from the group consisting of an unsaturated carboxylic acid and a derivative of an unsaturated carboxylic acid, and (C) 0.01 to 3 parts by mass of an organic peroxide.

[(A) Thermoplastic Resin]

The above component (A) comprises 10 to 90% by mass of (a1) a cyclic polyolefin-based polymer and 90 to 10% by mass of (a2) one or more selected from the group consisting of a copolymer of an aromatic vinyl compound and a conjugated diene compound and a hydrogenated product thereof. Preferably, the component (A) comprises of 40 to 80% by mass of the component (a1) and 60 to 20% by mass of the component (a2). Here, the total of the components (a1) and (a2) is 100% by mass. Further, in the present invention, the component (a2) excludes a hydrogenated product of a block copolymer of a polymer block mainly composed of an aromatic vinyl compound and a random copolymer block composed of a conjugated diene compound and an aromatic vinyl compound.

When the content of the above component (a1) is 10% by mass or more, preferably 40% by mass or more (the content of the above component (a2) is 90% by mass or less, preferably 60% by mass or less), the adhesiveness is improved. When the above content of the above component (a1) is 90% by mass or less, preferably 80% by mass or less (the content of the above component (a1) is 10% by mass or more, preferably 20% by mass or more), the impact resistance is improved.

<(a1) Cyclic Polyolefin-Based Polymer>

The above component (a1) is a polymer mainly including a structural unit (usually 50% by mass or more, preferably 70% by mass or more, more preferably 90% by mass or more of the structural unit based on the polymer) derived from a cyclic olefin (a polymerizable compound having a cyclic structure formed by carbon atoms and having an ethylenic carbon-carbon double bond in the ring).

Examples of the above cyclic olefin include cyclobutene, cyclopentene, cyclopentadiene, norbornene (bicyclo [2.2.1] hepta-2-ene), dicyclopentadiene (tricyclo [4.3.0.12,5] deca-3,7-diene), tetracyclododecene (tetracyclo [4.4.0.12,5.17, 10] dec-3-ene), and derivatives thereof.

The above cyclic polyolefin-based polymer can be produced by using a known polymerization method using one or more of the above cyclic olefins. At that time, one or more other monomers copolymerizable with the cyclic olefin may be used.

Examples of the other monomers include α-olefins such as ethylene, propylene, 1-butene, 1-pentene, 1-hexene, 3-methyl-1-butene, 2-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene; non-conjugated dienes such as 1,4-hexadiene, 4-methyl-1,4-hexadiene, 5-methyl-1,4-hexadiene and 1,7-octadiene; and the like.

From the viewpoint of adhesiveness, it is preferable to use a copolymer with a cyclic olefin and an α-olefin having 2 to 8 carbon atoms (for example, ethylene, propylene, 1-butene, 1-pentene, 1-hexene, 1-octene, and the like) as the above component (a1). A copolymer of one or more selected from the group consisting of norbornene and derivatives thereof with an α-olefin having 2 to 8 carbon atoms is more preferable.

The glass transition temperature of the above component (a1) is preferably 70 to 160° C., and more preferably 75 to 140° C. When the glass transition temperature is 70° C. or higher, heat resistance is improved. When the glass transition temperature is 160° C. or less, productivity as a composition is improved.

In the present specification, the glass transition temperature is an intermediate glass transition temperature calculated form the curve of the final temperature rising process measured by a program of maintaining the temperature at 350° C. for 5 minutes, lowering the temperature to 30° C. at 10° C./min, maintaining the temperature at 30° C. for 3 minutes, and raising the temperature to 350° C. at 10° C./min using a Diamond DSC type differential scanning calorimeter manufactured by Perkin Elmer Japan Co., Ltd in accordance with JIS K 7121-1987.

A melt flow rate (hereinafter abbreviated as "MFR") measured at 260° C. and 21.18 N in accordance with JIS K 7210-1999 of the above component (a1) is preferably 0.1 to 50 g/10 min, more preferably 1 to 20 g/10 min. When the MFR is within the above range, molding processability is improved.

Examples of commercially available products of the above component (a1) may include "TOPAS 8007", "TOPAS 6013", "TOPAS 6015" of Polyplastics Co., Ltd "APEL APL6013T", "APEL APL6015T", of Mitsui Chemicals Co., Ltd, and "ZEONOR 1020 R", "ZEONOR 1060 R" of Zeon Corporation, and the like.

As the above component (a1), one or more of these can be used.

<(a2) Copolymer of Aromatic Vinyl Compound and Conjugated Diene Compound, and Hydrogenated Product Thereof>

The above component (a2) is one or more selected from the group consisting of a copolymer of an aromatic vinyl compound and a conjugated diene compound, and a hydrogenated product thereof. However, a hydrogenated product of a block copolymer comprising a polymer block mainly composed of an aromatic vinyl compound and a random copolymer block of a conjugated diene compound and an aromatic vinyl compound is excluded from the above component (a2). Here, "a polymer block mainly composed of an aromatic vinyl compound" means that the content of the structural unit derived from the aromatic vinyl compound in the polymer block is usually 90% by mass or more. And "random copolymer block of a conjugated diene compound and an aromatic vinyl compound" usually means a random copolymer block of a significant amount of a conjugated diene compound and a significant amount of an aromatic vinyl compound. Typically, it is a random copolymer block comprising 10 to 97% by mass of a structural unit derived from a conjugated diene compound and 90 to 3% by mass of a structural unit derived from an aromatic vinyl compound. Here, the total of the content of the structural unit derived from the conjugated diene compound and the content of the structural unit derived from the aromatic vinyl compound is 100% by mass.

Examples of the copolymer of the aromatic vinyl compound and the conjugated diene compound and the hydrogenated product thereof may include a block copolymer of the above aromatic vinyl compound and the conjugated diene compound, a hydrogenated product of a block copolymer of the above aromatic vinyl compound and the conjugated diene compound, a random copolymer of the above aromatic vinyl compound and the conjugated diene compound and a hydrogenated product of a random copolymer of the above aromatic vinyl compound and the conjugated diene compound.

The above aromatic vinyl compound is a polymerizable monomer having a polymerizable carbon-carbon double bond and an aromatic ring. Examples of the aromatic vinyl compound may include styrene, t-butylstyrene, α-methylstyrene, p-methylstyrene, divinylbenzene, 1,1-diphenylstyrene, N,N-diethyl-p-aminoethylstyrene, vinyltoluene, and p-tert-butylstyrene. Among these, styrene is preferred. As the aromatic vinyl compound, one kind or two or more kinds of these can be used in combination.

The above conjugated diene is a polymerizable monomer having a structure in which two carbon-carbon double bonds are bonded by one carbon-carbon single bond. Examples of the conjugated diene may include 1,3-butadiene, isoprene (2-methyl-1,3-butadiene), 2,3-dimethyl-1,3-butadiene and chloroprene (2-chloro-1,3-butadiene) and the like. Among these, 1,3-butadiene and isoprene are preferred. As the above conjugated dienes, one kind or two or more kinds of these can be used in combination.

The block copolymer of the above aromatic vinyl compound and the conjugated diene compound is a block copolymer comprising at least one, or preferably two or more of copolymer block A mainly composed of an aromatic vinyl compound, and at least one of copolymer block B mainly composed of a conjugated diene compound. For example, it may include a block copolymer of an aromatic vinyl compounds and conjugated diene compound, having a structure such as A-B, A-B-A, B-A-B-A, A-B-A-B-A. The above block copolymer may contain a structural unit derived from an aromatic vinyl compound in an amount of usually 5 to 60% by mass, preferably 20 to 50% by mass.

The above polymer block A is a polymer block composed of only an aromatic vinyl compound or a copolymer block of an aromatic vinyl compound and a conjugated diene compound. In the case where the polymer block A is a copolymer block, the content of the structural unit derived from the aromatic vinyl compound in the polymer block A is usually 50% by mass or more, preferably 70% by mass or more, more preferably 90% by mass or more. The distribution of the structural unit derived from the conjugated diene compound in the polymer block A is not particularly limited and may be arbitrary. When there are two or more polymer blocks A, they may have the same structure or different structures from each other.

The above polymer block B is a polymer block comprising only a conjugated diene compound or a copolymer block of an aromatic vinyl compound and a conjugated diene compound. In the case where the above polymer block B is a copolymer block, the content of the structural unit derived from the conjugated diene compound in the polymer block B is usually 50% by mass or more, preferably 70% by mass or more, more preferably 90% by mass or more, more preferably 95% by mass or more. The distribution of the structural units derived from the aromatic vinyl compound in the polymer block B is not particularly limited, and may be arbitrary. The bonding mode between the conjugated diene compound and the conjugated diene compound (hereinafter sometimes abbreviated as microstructure) is not particularly limited and may be arbitrary. When there are two or more polymer blocks B, they may have the same structure or different structures from each other.

The number average molecular weight of the block copolymer of the above aromatic vinyl compound and the conjugated diene compound is preferably 5,000 to 1,500,000, more preferably 10,000 to 550,000, still more preferably 100,000 to 400,000. The molecular weight distribution (the weight average molecular weight/the number average molecular weight) may preferably be 10 or less. The molecular chain structure of the block copolymer of the above aromatic vinyl compound and the conjugated diene compound may be linear, branched, radial, or any combination thereof. The weight average molecular weight (Mw) and the number average molecular weight (Mn) are to be understood as polystyrene equivalent values by gel permeation chromatography (GPC).

Examples of the block copolymer of the above aromatic vinyl compound and the conjugated diene compound may include a styrene-butadiene-styrene block copolymer (SBS) and a styrene-isoprene-styrene block copolymer (SIS) and the like.

The block copolymer of the above aromatic vinyl compound and the conjugated diene compound is not particularly limited. What is obtained by copolymerization of any aromatic vinyl compound and any conjugated diene by a known method such as a method described in Japanese Examined Patent Publication No. S40-023798 can be used.

The hydrogenated product of the block copolymer of the above aromatic vinyl compound and the conjugated diene compound is obtained by adding hydrogen to the carbon-carbon double bond in the block copolymer of the aromatic vinyl compound and the conjugated diene compound in order to change the carbon-carbon double bond to the carbon-carbon single bond. The hydrogenation can be carried out by a known method, for example, a hydrogenation treatment using a hydrogenation catalyst in an inert solvent.

The hydrogenation rate of the hydrogenated product of the block copolymer of the above aromatic vinyl compound and the conjugated diene compound (the ratio of the number of bounds that became a caron-carbon single bond by hydrogenation to the number of the carbon-carbon double bond in the block copolymer of the aromatic vinyl compound and the conjugated diene compound before hydrogenation) is not particularly limited, but it is usually 50% or more, preferably 70% or more, more preferably 90% or more from the viewpoint of bleed resistance.

When the conjugated diene polymer block of the hydrogenated product of the block copolymer of the aromatic vinyl compound and the conjugated diene compound is a butadiene polymer block, the microstructure thereof is such that the proportion of 1,2-bond is preferably from 20 to 50% by mass, more preferably from 25 to 45% by mass, from the viewpoint of impact resistance. From the viewpoint of heat aging resistance and weather resistance, it may be what is obtained by selectively hydrogenating 1,2-bonds.

When the conjugated diene polymer block of the hydrogenated product of the block copolymer of the above aromatic vinyl compound and the conjugated diene compound is a copolymer block of isoprene and butadiene, microstructure thereof is such that the proportion of 1,2-bond is, preferably less than 50%, more preferably less than 25%, still more preferably less than 15% from the viewpoint of heat aging resistance and weather resistance.

In the case where the conjugated diene polymer block of the hydrogenated product of the block copolymer of the aromatic vinyl compound and the conjugated diene compound is an isoprene polymer block, the microstructure thereof is such that the proportion of 1,4-bond is preferably 70 to 100% by mass from the viewpoint of impact resistance. The hydrogenation rate is preferably 90% or more from the viewpoint of bleed resistance.

The content of the structural unit derived from the aromatic vinyl compound in the hydrogenated product of the block copolymer of the aromatic vinyl compound and the conjugated diene compound is preferably 5 to 70% by mass, more preferably from 20 to 50% by mass from the viewpoint of mechanical properties. The number average molecular weight of the hydrogenated product of the block copolymer of the aromatic vinyl compound and the conjugated diene compound is preferably 30,000 or more, more preferably 100,000 or more from the viewpoint of bleed resistance. It may be preferably 350,000 or less, more preferably 250,000 or less from the viewpoint of compatibility.

Examples of the hydrogenated product of the block copolymer of the aromatic vinyl compound and the conjugated diene compound may include styrene•ethylene•butene copolymer (SEB), styrene•ethylene•propylene copolymer (SEP), styrene•ethylene•butene•styrene copolymer (SEBS), styrene•ethylene•propylene•styrene copolymer (SEPS), styrene•ethylene•ethylene•propylene•styrene copolymer (SEEPS), styrene•butadiene•butylene•styrene copolymer (partial hydrogenation product of styrene•butadiene•styrene copolymer: SBBS), partial hydrogenation product of styrene•isoprene•styrene copolymer, and partial hydrogenation product of styrene•isoprene•butadiene•styrene copolymer and the like.

From the viewpoint of mechanical strength, examples of the random copolymer of the above aromatic vinyl compound and the conjugated diene compound may include preferably a structural unit derived from an aromatic vinyl compound, in an amount of preferably 3% by mass or more, more preferably 5% by mass or more (a structural unit derived from conjugate diene compound in an amount of preferably 97% by mass or less, more preferably 95% by mass or less). On the other hand, from the viewpoint of impact resistance, the content of the structural unit derived from the aromatic vinyl compound may be preferably 60% by mass or less, more preferably 50% by mass or less (the structural unit derived from the conjugated diene compound may be preferably 40% by mass or more, more preferably 50% by mass or more). Here, the total of the structural unit derived from the aromatic vinyl compound and the structural unit derived from the conjugated diene compound is 100% by mass.

The number average molecular weight of the random copolymer of the aromatic vinyl compound and the conjugated diene compound may be preferably 150,000 to 500,000, more preferably 170,000 to 400,000, and still more preferably 200,000 to 350,000. The molecular weight distribution (the weight average molecular weight/the number average molecular weight) may preferably be 10 or less.

The random copolymer of the aromatic vinyl compound and the conjugated diene compound may include, for example, a random copolymer of styrene and butadiene (SBR) and the like.

The hydrogenated product of the random copolymer of the above aromatic vinyl compound and the conjugated diene compound is produced by hydrogenating a random copolymer of the above aromatic vinyl compound and the conjugated diene compound. The hydrogenation ratio (the ratio of the number of bonds that became a carbon-carbon single bond by hydrogenation to the number of carbon-carbon double bonds in the random copolymer of the aromatic vinyl compound and the conjugated diene compound before hydrogenation) is not particularly limited, but it may be usually 90% or more, preferably 99% or more.

Examples of the hydrogenated product of the random copolymer of the aromatic vinyl compound and the conjugated diene compound may include a hydrogenated product of a random copolymer of styrene and butadiene (HSBR), and the like.

As the component (a2) contained in the thermoplastic resin composition of the present invention, a hydrogenated product of a block copolymer of an aromatic vinyl compound and a conjugated diene compound, and a hydrogenated product of a random copolymer of an aromatic vinyl compound and a conjugated diene compound are preferable. Further, a hydrogenated product of a block copolymer of an aromatic vinyl compound and a conjugated diene compound is more preferable.

As the above-mentioned component (a2), one kind or a mixture of two or more kinds of these can be used.

The copolymer of the aromatic vinyl compound and the conjugated diene compound and/or the hydrogenated product thereof may include, insofar as the object of the present invention is not contrary, structural units derived from the polymerizable compound other than the above aromatic vinyl compound and the above conjugated diene compound.

Examples of the above polymerizable compound may include α-olefins such as ethylene, propylene, 1-butene, 1-hexene and 1-octene; non-conjugated dienes such as isobutylene; methyl acrylate, ethyl acrylate, butyl acrylate, (meth) acrylic acid esters such as methyl methacrylate, ethyl methacrylate, and butyl methacrylate; and maleic anhydride and the like.

[(B) Unsaturated Carboxylic Acid, Derivative of Unsaturated Carboxylic Acid]

The above component (B) is one or more selected from the group consisting of unsaturated carboxylic acid and derivatives of unsaturated carboxylic acid. The above component (B) is subjected to graft polymerization with the above component (A) in order to give the thermoplastic resin composition of the present invention adhesiveness with resins having polar groups such as ethylene-vinyl-alcohol copolymer (EVOH), nylon, polyester and the like, and a metal.

The unsaturated carboxylic acid may include, for example, maleic acid, itaconic acid, fumaric acid, acrylic acid, methacrylic acid and the like. The derivatives of the unsaturated carboxylic acid may include maleic acid monoester, maleic acid diester, maleic anhydride, itaconic acid monoester, itaconic acid diester, itaconic anhydride, fumaric acid monoester, fumaric acid diester, fumaric acid anhydride, acrylic acid alkyl ester such as methyl acrylate and the like, and methacrylic acid alkyl esters such as methyl methacrylate. As the above component (B), one kind or a mixture of two or more kinds of these can be used.

As the above component (B), maleic anhydride is preferable from the viewpoint of reactivity with the component (A) and adhesiveness of the composition.

The amount of the above component (B) is 0.05 to 5 parts by mass based on 100 parts by mass of the above component (A). It is 0.05 parts by mass or more, preferably 0.1 parts by mass or more from the viewpoint of improving the adhesiveness of the thermoplastic resin of the present invention. In addition, it is 5 parts by mass or less, preferably 3 parts by mass or less from the view point that the component (B) remains in the composition without reacting at the time of modification (during graft polymerization), thereby preventing color tone change (yellowing) and appearance defects such as gel of the article made of the composition.

[(C) Organic Peroxide]

The component (C) of the present invention is an organic peroxide, and which functions to catalyze the graft polymerization reaction of the above component (A) and the above component (B).

Examples of the organic peroxide include dicumyl peroxide, di-tert-butyl peroxide, 2,5-dimethyl-2,5-di-(tert-butylperoxy) hexane, 2,5-dimethyl-2,5-di (tert-butylperoxy) hexyne-3,1,3-bis (tert-butylperoxyisopropyl) benzene, 1,1-bis (tert-butylperoxy)-3,3,5-trimethyl cyclohexane, n-butyl-4,4-bis (tert-butylperoxy) valerate, benzoyl peroxide, p-chlorobenzoyl peroxide, 2,4-dichlorobenzoyl peroxide, tert-butyl peroxybenzoate, tert-butyl peroxy isopropyl carbonate, diacetyl peroxide, lauroyl peroxide, and tert-butyl cumyl peroxide and the like. As the above component (C), one kind or a mixture of two or more kinds of these can be used.

From the viewpoint of the manufacturability and adhesiveness of the composition, it is preferable to use 2,5-dimethyl-2,5-di-(tert-butylperoxy) hexane and 2,5-dimethyl-2,5-di-(tert-butylperoxy) hexyne-3 as the above component (C).

The amount of the component (C) is 0.001 to 3 parts by mass based on 100 parts by mass of the above component (A). It is 0.001 parts by mass or more, preferably 0.03 parts by mass or more from the viewpoint of improving the adhesiveness of the thermoplastic resin composition of the present invention and preventing gel formation during film formation. In addition, it is 3 parts by mass or less, preferably 2 parts by mass or less from the viewpoint of suppressing color tone change (yellowing) and melt viscosity lowering at the time of modification.

Examples of commercially available products of the above component (C) may include "Perhexa 25B (trade name)" and "Perhexane 25B (trade name)" manufactured by NOF CORPORATION.

The thermoplastic resin composition of the present invention may further include, if desired, components other than the above components (A) to (C), for example, thermoplastic resins other than the above component (A); pigment, inorganic filler, organic filler, resin filler; additives such as lubricant, antioxidant, weathering stabilizer, heat stabilizer, release agent, antistatic agent and the like.

[Production of Thermoplastic Resin Composition]

The thermoplastic resin composition of the present invention can be obtained by melt-kneading the above-mentioned components (A) to (C) and optional components used if desired with an optional melt-kneading machine.

Preferably, the above thermoplastic resin composition can be obtained by melt-kneading the above-mentioned components (A) to (C) and optional components used if desired with an optional melt-kneading machine, preferably at the 1 minute half-life temperature for 1 minute or more, more preferably at a temperature not lower than the one-minute half-life temperature of the component (C) for 2 minutes or more. The one-minute half-life temperature is a temperature at which the half-life is one minute. It means that the time required that the current concentration of the binding is half of the initial concentration is one minute when the —O—O— bond in the component (C) is decomposed at this temperature.

The melt-kneading machine is not particularly limited, but examples thereof may include a single screw extruder, a twin screw extruder, a Banbury mixer, various kneaders, and an apparatus combining two or more of these.

The melt mass flow rate of the above thermoplastic resin measured under the conditions of 230° C. and 21.18 N in accordance with JIS K7210:1999 is preferably 0.5 g/10 minutes or more. From the viewpoint of moldability at the time of molding the laminate using the thermoplastic resin composition and adhesiveness of the composition, it is preferably 15 g/10 min or less.

The above thermoplastic resin composition is characterized in that a polar group such as a carboxyl group is introduced into a cyclic polyolefin-based nonpolar material, and it exhibits good adhesion with various materials. Examples of nonpolar materials exhibiting good adhesiveness with various materials may include polyethylene, polypropylene, poly-1-butene, poly 4-methyl-1-pentene, cyclic polyolefin and the like. Examples of the polar material may include resins having polar groups such as ethylene-vinyl alcohol copolymer (EVOH), nylon, polyurethane and polyester; metals such as iron, aluminum, copper, silver, gold, and tin; metal compounds (inorganic metal compounds) such as oxides, nitrides, fluorides, and sulfides of one or m ore metals such as aluminum, tin, zinc, indium, germanium, antimony, and cerium. In particular, it is surprising that it shows good adhesion to both polyolefin and ethylene-vinyl alcohol copolymer having a large amount of hydroxyl group. Therefore, the thermoplastic resin composition of the present invention can be suitably used as an adhesive material.

[Adhesive Coating Material]

The adhesive coating material of the present invention can be obtained by dissolving the thermoplastic resin composition of the present invention in a solvent by an arbitrary method.

The solvent is not particularly limited as long as it is a solvent capable of dissolving the thermoplastic resin composition of the present invention, and any solvent can be used. Examples of the above solvent may include toluene, xylene, methyl isobutyl ketone, cyclohexane, methylcyclohexane, tetrahydrofuran, and chloroform. Among them, toluene and cyclohexane are preferable from the viewpoint of solubility and storage stability. As the above solvent, one or more of these solvents can be used.

Although the amount of the solvent to be blended depends on the thickness of the coating film to be formed by using the adhesive coating material of the present invention, in the case of using a common coating apparatus, it may be 100 to 2000 parts by mass, preferably 300 to 1800 parts by mass, more preferably 500 to 1500 parts by mass.

The adhesive coating material of the present invention may further include, if desired, components (A) to (C) and components other than the above solvents, for example, thermoplastic resin composition other than the above component (A); a pigment, an inorganic filler, an organic filler, a resin filler; additives such as a lubricant, an antioxidant, a weathering stabilizer, a heat stabilizer, a release agent, an antistatic agent, and a surfactant and the like.

[Laminate]

A preferable article obtained by using the thermoplastic resin composition of the present invention may include a laminate having at least one layer comprising the thermoplastic resin composition of the present invention.

The thickness of the layer comprising the thermoplastic resin composition of the present invention may be generally 1 μm or more, preferably 2 μm or more, from the viewpoint of adhesiveness. From the viewpoint of economic efficiency, it may be usually 100 μm or less, preferably 30 μm or less.

The overall thickness of the laminate may be generally from 10 to 1000 μm, preferably from 20 to 500 μm, from the viewpoint of productivity of the laminate, mechanical strength, and web handling property.

Preferable embodiments of the laminate may include, for example, a laminate in which a layer comprising a cyclic polyolefin polymer, a layer comprising a thermoplastic resin composition of the present invention, and a layer comprising a resin having a polar group are laminated in this order; and a laminate in which a layer comprising a cyclic polyolefin-based polymer, a layer comprising a thermoplastic resin composition of the present invention, a layer comprising a resin having a polar group, a layer comprising a thermoplastic resin composition of the present invention, and a layer comprising a cyclic polyolefin-based polymer are laminated in this order.

A more preferable embodiment of the laminate may include, for example, a laminate in which a layer comprising a cyclic polyolefin-based polymer, a layer comprising a thermoplastic resin composition of the present invention, and a layer comprising a resin having a polar group are directly laminated in this order; and a laminate in which a layer comprising a cyclic polyolefin-based polymer, a layer comprising a thermoplastic resin composition of the present invention, a layer comprising a resin having a polar group, a layer comprising a thermoplastic resin composition of the present invention, and a a layer comprising a polyolefin-based polymer are directly laminated in this order.

The layer comprising a resin having a polar group in the above laminate is preferably a layer comprising an ethylene-vinyl alcohol copolymer.

The method for producing the above laminate is not particularly limited, and any method can be used to produce the laminate by an arbitrary apparatus. Examples of the above method may include a T-die co-extrusion method of melt extruding each material of each layer in each extruder from a T-die by a multi-manifold method, a stack plate method, or a feed block method; an extrusion lamination method of obtaining resin films of each layer by an arbitrary method and then melt extruding another resin layer on the films; a method of obtaining resin films of each layer by an arbitrary method and then integrating them by thermal lamination; and a method of obtaining a film of a cyclic polyolefin-based copolymer and a film of a resin having a polar groups by an arbitrary method, and then dry laminating them using the adhesive coating material of the present invention, and the like.

The laminate of the present invention having the above-mentioned aspect of the present invention can be suitably used as a laminate having high strength, high gas barrier property, chemical resistance and the like, for example, as a packaging film or storage container for foods, medical instruments, etc.

Another preferred embodiment of the laminate of the present invention may include, for example, a laminate in which a layer comprising a cyclic polyolefin-based polymer, a layer comprising a thermoplastic resin composition of the present invention, and a layer comprising a metal or a metal compound are laminated in this order; and a laminate in which a layer comprising a cyclic polyolefin-based polymer, a layer comprising a thermoplastic resin composition of the present invention, a layer comprising a metal or a metal compound, a layer comprising a thermoplastic resin composition of the present invention, and a layer comprising a cyclic polyolefin-based polymer are laminated in this order.

A more preferable embodiment of the laminate may include, for example, a laminate in which a layer comprising a cyclic polyolefin-based polymer, a layer comprising a thermoplastic resin composition of the present invention, and a layer comprising a metal or a metal compound are directly laminated in this order; and a laminate in which a layer comprising a cyclic polyolefin-based polymer, a layer comprising a thermoplastic resin composition of the present invention, a layer comprising a metal or a metal compound, a layer comprising a thermoplastic resin composition of the present invention, and a layer of a cyclic polyolefin-based polymer are directly laminated in this order.

The layer made of a metal or a metal compound in the above laminate is preferably a layer made of an aluminum foil.

The method for producing the laminate is not particularly limited, and any method can be used to produce the laminate by an arbitrarymachine. The above-mentioned method may include, for example, an extrusion lamination method wherein a foil made of a metal or a metal compound is prepared, and then a laminate having a layer comprising a cyclic polyolefin-based polymer and a layer comprising the thermoplastic composition of the present invention is melt extruded on the foil so that the layer comprising the thermoplastic composition of the present invention is on the foil side; a thermal lamination method wherein a laminate having a layer comprising a cyclic polyolefin-based polymer and a layer comprising the thermoplastic resin composition of the present invention is obtained by an arbitrary method, and then the laminate thus obtained and the above foil are thermally laminated so that the thermoplastic composition of the present invention is on the foil side; and a dry lamination method wherein a film of a cyclic polyolefin-based polymer is obtained by an arbitrary method, and then the film is laminated with the above foil using the adhesive coating material of the present invention, and the like.

The above method may include, for example, an extrusion lamination method wherein a laminate having a layer comprising a cyclic polyolefin-based polymer and a layer comprising a thermoplastic resin composition of the present invention is melt extruded on the layer comprising a laminate of a metal or a metal compound having a layer comprising a metal or a metal compound on at least one surface of the laminate so that the thermoplastic composition of the present invention is on the side of the layer comprising a metal or a metal compound; a method wherein a laminate having a layer comprising a cyclic polyolefin-based polymer and a layer comprising the thermoplastic composition of the present invention is obtained by an arbitrary method, and then the laminate thus obtained is thermally laminated with a laminate having a layer comprising a metal or a metal compound on at least one surface of the laminate so that the layer comprising the thermoplastic composition of the present invention is on the side of the layer comprising a metal or a metal compound, and the like.

A laminate having at least one layer of the above metal or metal compound on its surface may include, for example, a laminate of an arbitrary film-like base material and a foil comprising a metal or a metal compound by a dry lamination method, a heat laminate lamination method or the like; a laminate obtained by vapor-depositing a metal or a metal compound on an arbitrary film-like substrate by an arbitrary method; a laminate obtained by melt-extruding an arbitrary thermoplastic resin on a foil comprising a metal or a metal compound; and a laminate in which a coating film is formed on a foil comprising a metal or a metal compound by using an arbitrary coating agent, and the like.

The above aspects of the laminate of the present invention can be used, as a laminate having a very high gas barrier property, for a packaging film or a container for contents such as foods, medical instruments, medicines and the like that are vulnerable to oxygen or moisture.

EXAMPLES

Examples of products using the laminate of the present invention as a packaging film or a storage container may include press-through pack products and the like.

Hereinafter, the present invention will be explained by way of Examples, but is not limited thereto.
<Measurement Method>
(1) Adhessiveness:
(1-1) To Cyclic Polyolefin-Based Copolymer:

The adhesive composition obtained as follows was extruded using a 40 mm single screw extruder, and a cyclic polyolefin-based polymer ("TOPAS 8007F-04 (trade name)" from Polyplastics Co., Ltd.) was extruded using a 25 mm single screw extruder, from a two-color molding die at a die temperature of 240° C. Thereby 2-color molded product having a layer comprising a cyclic polyolefin-based polymer with a rectangular shape and a thickness of 0.1 mm was formed on the layer comprising the adhesive composition having a rectangular shape and a thickness of 1 mm, as well as having a rectangular sectional shape in the vertical direction with respect to a machine direction.

A sample cut into a width of 15 mm was taken from the vicinity of the center in the width direction of the two-color molded product obtained above. With reference to 10.4 of JIS Z 0237: 2009, the 180 degree peel adhesion of the layer comprising the cyclic polyolefin-based copolymer to the layer of the adhesive composition was measured under the condition of a test speed of 300 mm/min, assuming that the layer of the adhesive composition was a test plate, and the layer of the cyclic polyolefin-based copolymer was an adhesive tape.

In addition, when adhesiveness was very high and a starting point of peeling could not be made, ">>" was written in the table.

(1-2) To Ethylene-Vinyl Alcohol Copolymer

The adhesive composition obtained as follows was extruded using a 40 mm single screw extruder, and an ethylene-vinyl alcohol copolymer ("EVAL L-171B (trade name)" from KURARAY Co., Ltd.) was extruded using a 25 mm single screw extruder, from a two-color molding die at a die temperature of 200° C. Thereby 2-color molded product having a layer comprising an ethylene-vinyl alcohol copolymer with a rectangular shape and a thickness of 0.1 mm was formed on the layer comprising the adhesive composition having a rectangular shape and a thickness of 1 mm, as well as having a rectangular sectional shape in the vertical direction with respect to a machine direction.

A sample cut into a width of 15 mm was taken from the vicinity of the center in the width direction of the two-color molded product obtained above. With reference to 10.4 of JIS Z 0237: 2009, the 180 degree peel adhesion of the layer comprising the ethylene-vinyl alcohol copolymer to the layer of the adhesive composition was measured under the condition of a test speed of 300 mm/min, assuming that the layer of the adhesive composition was a test plate, and the layer of the ethylene-vinyl alcohol copolymer was an adhesive tape.

(1-3) To Metal Foil

The adhesive composition obtained as follows was applied to a 25 μm aluminum foil (untreated aluminum foil of UACJ Co., Ltd.) by using a 40 mm single screw extruder at a die temperature of 200° C. Under the conditions, extrusion at a thickness of 1 mm and lamination were carried out.

A sample cut into a width of 15 mm was taken from the vicinity of the center in the width direction of the laminated article obtained above. With reference to 10.4 of JIS Z 0237: 2009, the 180 degree peel adhesion of the layer of the metal foil to the layer of the adhesive composition was measured under the condition of a test speed of 300 mm/min, assuming that the layer of the adhesive composition was a test plate, and the layer of the metal foil was an adhesive tape.

(2) Impact Resistance (Izod Impact Strength)

A ¼ inch thick injection sheet was used as a test piece, which was prepared by using an injection molding machine with a mold clamping pressure of 125 tons, at a cylinder temperature of 260 to 280° C., and a mold temperature of 30° C. And then Izot impact strength (with notch) of the test piece thus obtained was measured according to ASTM D 256. In addition, the example in which the test piece did not break was described as NB.

(3) Pellet Productivity

The pellets obtained by the strand cutting method of the adhesive composition were visually observed and evaluated according to the following criteria.
◯: Pellet shape is good.
x: At least one of the following defects occurred.
Blocking is observed in pellets.
Pellet shape is irregular.
Component bleed is observed in pellets.
<Materials Used>
Component (a1):
(a1-1): Cyclic olefin copolymer "TOPAS 8007F-04 (trade name)" from Polyplastics Co., Ltd., glass transition temperature 79° C., MFR (260° C., 2.16 kg) 32 g/10 min.
(a1-2): Cyclic olefin copolymer "TOPAS 6013 F-04 (trade name)" of Polyplastics Co., Ltd., glass transition temperature 139° C., MFR (260° C., 2.16 kg) 14 g/10 minutes.
(a1-3): Cyclic olefin copolymer "APEL 6013T (trade name)" from Mitsui Chemicals, Co., Ltd., glass transition temperature 125° C., MFR (260° C., 2.16 kg) 14 g/10 minutes.
(a1-4): Cyclic olefin polymer "ZEONOR 1020 R (trade name)" manufactured from Zeon Corporation, glass transition temperature 102° C., MFR (280° C., 21.18 N) 20 g/10 min. Component (a2):
(a2-1): Styrene-ethylene-butadiene-styrene block copolymer "Tuftec H1052 (trade name)" from Asahi Kasei Corporation, a hydrogenation rate of 90 mol % or more, a content of a structural unit derived from styrene of 20% by weight.
(a2-2): Styrene-ethylene-propylene-styrene block copolymer "Septon 2002 (trade name)" from KURARAY CO., Ltd., a hydrogenation rate of 90 mol % or more, a content of structural units derived from styrene of 30% by mass.
(a2-3): Hydrogenated product of a random copolymer composed of 1,3-butadiene and styrene "DYNARON 1320P (trade name)" from JSR Corporation, a hydrogenation rate of 99 mol %, a content of a structural unit derived from styrene of 10% by mass.
Component (B):
(B-1): Maleic anhydride from Nippon Shokubai Co., Ltd.
Component (C):
(C-1): 2,5-dimethyl-2,5-di-(t-butylperoxy) hexane "Perhexa 25B (trade name)", from NOF Corporation, 1 minute half-life temperature of 180° C.

Examples 1 to 19

Using a co-rotating twin-screw extruder, a mixture of the formulations (parts by mass) shown in any one of Tables 1 to 3 was collectively fed, and melt kneading was carried out under conditions of an extruder outlet resin temperature of 190° C. in order to obtain an adhesive composition. Evaluations (1) to (3) were performed on the obtained adhesive composition. The results are shown in any one of Tables 1 to 3.

TABLE 1

|  |  | Ex. 1 | Ex. 2 | Ex. 3 | Ex. 4 | Ex. 5 | Ex. 6 |
|---|---|---|---|---|---|---|---|
| Formulation | a1-1 | 7 | 20 | 50 | 70 | 85 | 95 |
| (parts by | a1-2 |  |  |  |  |  |  |
| mass) | a1-3 |  |  |  |  |  |  |
|  | a1-4 |  |  |  |  |  |  |

TABLE 1-continued

|  |  | Ex. 1 | Ex. 2 | Ex. 3 | Ex. 4 | Ex. 5 | Ex. 6 |
|---|---|---|---|---|---|---|---|
|  | a2-1 | 93 | 80 | 50 | 30 | 15 | 5 |
|  | a2-2 |  |  |  |  |  |  |
|  | a2-3 |  |  |  |  |  |  |
|  | B-1 | 0.2 | 0.2 | 0.2 | 0.2 | 0.2 | 0.2 |
|  | C-1 | 0.05 | 0.05 | 0.05 | 0.05 | 0.05 | 0.05 |
| Results | Adhesiveness1-1N/15 mm | >> | >> | >> | >> | >> | >> |
|  | Adhesiveness1-2N/15 mm | <0.1 | 2 | 6 | 8 | 10 | 10 |
|  | Adhesiveness1-3N/15 mm | <0.1 | 2 | 5 | 7 | 8 | 8 |
|  | Impact strength J/m | NB | NB | NB | NB | 388 | 68 |
|  | Pellet productivity | X | ○ | ○ | ○ | ○ | X |

TABLE 2

|  |  | Ex. 7 | Ex. 8 | Ex. 9 | Ex. 10 | Ex. 11 | Ex. 12 |
|---|---|---|---|---|---|---|---|
| Formulation (parts by mass) | a1-1 |  |  |  | 70 | 70 | 70 |
|  | a1-2 | 70 |  |  |  |  |  |
|  | a1-3 |  | 70 |  |  |  |  |
|  | a1-4 |  |  | 70 |  |  |  |
|  | a2-1 | 30 | 30 | 30 |  |  | 30 |
|  | a2-2 |  |  |  | 30 |  |  |
|  | a2-3 |  |  |  |  | 30 |  |
|  | B-1 | 0.2 | 0.2 | 0.2 | 0.2 | 0.2 | 0.02 |
|  | C-1 | 0.05 | 0.05 | 0.05 | 0.05 | 0.05 | 0.05 |
| Results | Adhesiveness1-1N/15 mm | >> | >> | >> | >> | >> | >> |
|  | Adhesiveness1-2N/15 mm | 4 | 5 | 3 | 5 | 3 | <0.1 |
|  | Adhesiveness1-3N/15 mm | 4 | 5 | 3 | 5 | 3 | <0.1 |
|  | Impact strength J/m | NB | NB | 550 | 687 | 412 | NB |
|  | Pellet productivity | ○ | ○ | ○ | ○ | ○ | ○ |

TABLE 3

|  |  | Ex. 13 | Ex. 14 | Ex. 15 | Ex. 16 | Ex. 17 | Ex. 18 | Ex. 19 |
|---|---|---|---|---|---|---|---|---|
| Formulation (parts by mass) | a1-1 | 70 | 70 | 70 | 70 | 70 | 70 | 70 |
|  | a1-2 |  |  |  |  |  |  |  |
|  | a1-3 |  |  |  |  |  |  |  |
|  | a1-4 |  |  |  |  |  |  |  |
|  | a2-1 | 30 | 30 | 30 | 30 | 30 | 30 | 30 |
|  | a2-2 |  |  |  |  |  |  |  |
|  | a2-3 |  |  |  |  |  |  |  |
|  | B-1 | 0.08 | 4 | 5.5 | 0.2 | 0.2 | 0.2 | 0.2 |
|  | C-1 | 0.05 | 0.05 | 0.05 | 0 | 0.02 | 2.5 | 3.5 |
| Results | Adhesiveness1-1N/15 mm | >> | >> | >> | >> | >> | >> | >> |
|  | Adhesiveness1-2N/15 mm | 2 | 10 | 13 | <0.1 | 4 | 8 | 7 |
|  | Adhesiveness1-3N/15 mm | 2 | 11 | 13 | <0.1 | 3 | 8 | 8 |
|  | Impact strength J/m | NB | NB | NB | NB | NB | NB | NB |
|  | Pellet productivity | ○ | ○ | X | ○ | ○ | ○ | X |

The thermoplastic resin composition (adhesive composition) according to the present invention has excellent adhesiveness and impact resistance. Further, it is also excellent in productivity as a composition and thus the shape of pellets obtained from the composition is good.

The invention claimed is:

1. A thermoplastic resin composition comprising:

(A) 100 parts by mass of a thermoplastic resin;

(B) 0.05 to 5 parts by mass of one or more selected from the group consisting of an unsaturated carboxylic acid and a derivative of an unsaturated carboxylic acid; and (C) 0.01 to 3 parts by mass of an organic peroxide, said thermoplastic resin (A) comprising:

(a1) 10 to 90% by mass of a cyclic polyolefin-based polymer having a glass transition temperature of 70 to 160° C.; and (a2) 90 to 10% by mass of one or more selected from the group consisting of a copolymer of an aromatic vinyl compound and a conjugated diene compound and a hydrogenated product thereof except for a hydrogenated product of a block copolymer of a polymer block mainly composed of an aromatic vinyl compound and a random copolymer block composed of a conjugated diene compound and an aromatic vinyl compound, wherein the component (a2) is at least one selected from the group consisting of a styrene-ethylene-propylene copolymer (SEP), a styrene-ethylene-butene-styrene copolymer (SEBS), a styrene-ethylene-propylene-styrene copolymer (SEPS), a styrene-ethylene-ethylene-propylene-styrene copolymer (SEEPS) and a hydrogenated product thereof, wherein the total of the components (a1) and (a2) is 100% by mass, and the component (a1) is a copolymer of a cyclic olefin and an a-olefin having 2 to 8 carbon atoms.

2. The thermoplastic resin composition according to claim 1, wherein the component (a2) is a hydrogenated product of a block copolymer of an aromatic vinyl compound and a conjugated diene compound.

3. The thermoplastic resin composition according to claim 1, wherein the component (a2) is a hydrogenated product of a random copolymer of an aromatic vinyl compound and a conjugated diene compound.

4. An adhesive coating material comprising the thermoplastic resin composition according to claim 1.

5. A laminate comprising a layer comprising a cyclic polyolefin-based polymer, a layer comprising the thermoplastic resin composition according to claim 1, and a layer comprising a resin having a polar group, wherein said layers are laminated in this order.

6. A laminate comprising a layer comprising a cyclic polyolefin polymer, a layer comprising the thermoplastic resin composition according to claim 1, a layer comprising a resin having a polar group, a layer comprising the thermoplastic resin composition according to claim 1, and a layer comprising a cyclic polyolefin-based polymer, wherein said layers are laminated in this order.

7. The laminate according to claim 5, wherein the resin having a polar group is an ethylene-vinyl alcohol copolymer.

8. A laminate comprising a layer comprising a cyclic polyolefin-based polymer, a layer comprising the thermoplastic resin composition according to claim 1, and a layer comprising a metal or a metal compound, wherein said layers are laminated in this order.

9. A laminate comprising a layer comprising a cyclic polyolefin-based polymer, a layer comprising the thermoplastic resin composition according to claim 1, a layer comprising a metal or a metal compound, a layer comprising the thermoplastic resin composition according to claim 1, and a layer comprising a cyclic polyolefin-based polymer, wherein said layers are laminated in this order.

10. The laminate according to claim 8, wherein said layer comprising a metal or a metal compound is a layer comprising an aluminum foil.

11. A process for producing a thermoplastic resin composition comprising a step of melting and kneading a composition, wherein the composition comprises:
    (A) 100 parts by mass of a thermoplastic resin;
    (B) 0.05 to 5 parts by mass of one or more selected from the group consisting of an unsaturated carboxylic acid and a derivative of an unsaturated carboxylic acid; and
    (C) 0.01 to 3 parts by mass of an organic peroxide, said thermoplastic resin (A) comprising:
    (a1) 10 to 90% by mass of a cyclic polyolefin-based polymer having a glass transition temperature of 70 to 160° C.; and
    (a2) 90 to 10% by mass of one or more selected from the group consisting of a copolymer of an aromatic vinyl compound and a conjugated diene compound and a hydrogenated product thereof except for a hydrogenated product of a block copolymer of a polymer block mainly composed of an aromatic vinyl compound and a random copolymer block composed of a conjugated diene compound and an aromatic vinyl compound, wherein the component (a2) is at least one selected from the group consisting of a styrene-ethylene-propylene copolymer (SEP), a styrene-ethylene-butene-styrene copolymer (SEBS), a styrene-ethylene-propylene-styrene copolymer (SEPS), a styrene-ethylene-ethylene-propylene-styrene copolymer (SEEPS) and a hydrogenated product thereof, wherein the total of the components (a1) and (a2) is 100% by mass, and the component (a1) is a copolymer of a cyclic olefin and an a-olefin having 2 to 8 carbon atoms.

12. A process for producing an adhesive coating material comprising:
    a step (1) of producing a thermoplastic resin composition by the process according to claim 11; and
    a step (2) of dissolving the thermoplastic resin composition obtained in the step (1) in a solvent.

13. A press through package product comprising the laminate according to claim 5.

14. A process for producing a press through package product comprising:
    a step (1) of producing a thermoplastic resin composition by the process according to claim 13;
    a step (3) of producing a laminate by using the thermoplastic resin composition obtained in the step (1); and
    a step (4) of producing a press through package product by using the laminate obtained in the step (3).

* * * * *